United States Patent [19]

Fredrickson

[11] 4,436,156

[45] Mar. 13, 1984

[54] METHOD OF TREATING WELL FORMATIONS EMPLOYING FOAMED TREATMENT FLUIDS

[75] Inventor: Sherman E. Fredrickson, Duncan, Okla.

[73] Assignee: Halliburton Company, Duncan, Okla.

[21] Appl. No.: 390,156

[22] Filed: Jun. 21, 1982

[51] Int. Cl.³ ............... E21B 43/267; E21B 43/27
[52] U.S. Cl. ................... 166/307; 166/305 R; 166/308
[58] Field of Search ............. 166/280, 281, 305 R, 166/307, 308, 271

[56] References Cited

U.S. PATENT DOCUMENTS

| Re. 30,484 | 1/1981 | Broaddus et al. | 166/308 X |
|---|---|---|---|
| 2,859,821 | 11/1958 | Trott | 166/280 |
| 3,167,124 | 1/1965 | Graham | 166/308 X |
| 3,642,068 | 2/1972 | Fitch et al. | 166/308 X |
| 3,937,283 | 2/1976 | Blauer et al. | 166/308 X |
| 4,044,833 | 8/1977 | Volz | 166/308 X |
| 4,078,609 | 3/1978 | Pavlich | 166/280 X |
| 4,156,464 | 5/1979 | Hussin | 166/307 X |
| 4,237,975 | 12/1980 | Scherubel | 166/308 X |

OTHER PUBLICATIONS

Grundmann et al., "Foam Stimulation", *Journal of Petroleum Technology*, Mar. 1983, pp. 597–602.

Primary Examiner—George A. Suchfield
Attorney, Agent, or Firm—Robert A. Kent; Thomas R. Weaver

[57] ABSTRACT

A method for placing a foamed treating fluid in the upper portion of a fracture comprising the steps of: (i) introducing a foamed preflush fluid into the fracture; (ii) introducing an inert gas into the fracture to form a flow channel over the foamed preflush fluid located therein and (iii) introducing a foamed treatment fluid into the fracture whereby said treatment fluid is caused to flow through the flow channel over the foamed preflush fluid and enter the upper portion of the fracture.

20 Claims, 3 Drawing Figures

METHOD OF TREATING WELL FORMATIONS EMPLOYING FOAMED TREATMENT FLUIDS

BACKGROUND OF THE INVENTION

1. Field of the Invention

The present invention relates to the treatment of underground well formations, and more particularly, but not by way of limitation, to an improved method of placing a foamed treating fluid comprising a foamed acid or foamed fluid containing proppant material in the upper portion of substantially vertical fractures present in the formation.

2. Brief Description of the Prior Art

Many various methods have been developed and used for increasing and stimulating the production of oil, gas, and the like from an underground formation penetrated by a well bore. In treating such underground formations, particularly those formed of relatively impermeable and fracturable materials, it has become common practice to induce fractures in the most productive zone of the formation. The fractures then are extended laterally outward from the well bore to facilitate the flow of desired fluids from the formation into the well bore. In most formations, induced fractures are vertically oriented, that is, the fracture or fractures produced lie in a substantially vertical place paralleling the axis of the well bore. The induction of such fractures generally is accomplished by pumping a fluid known in the art as a "fracturing fluid" through the well bore into the formation. The fracturing fluid is utilized to exert hydraulic pressure on the formation at a location in the most productive and desired portion of the formation. The fluid pressure creates one or more fractures in the formation which then are extended outwardly from the well bore by continued pumping of the fracturing fluid at high pressure into the formation.

After the fractures have been created, the faces of the fractures can be etched with acid so that when the formation is returned to production and the fractures close, high capacity flow channels remain in the faces of the fractures through which desired fluids contained in the formation flow to the well bore. The acid can be introduced into the formation as the fractures are being produced and extended into the formation. This technique of fracturing and acidizing a formation to create flow channels is known in the art as "fracturing acidizing".

In an alternative method of producing high capacity flow channels in the formation, proppant material is introduced into the formation. After the fractures have been created and extended in the formation, a propping agent such as sand, glass beads, sintered bauxite or the like can be placed within the fractures to maintain the fractures open after fluid pressure on the formation is reduced and the fractures close.

In fracture acidizing as well as other fracture treatment procedures heretofore used, less than optimum results often have been achieved due to the treating fluid gravitating into the bottom portion of the fracture or fractures leaving the upper portion thereof untreated. This is particularly undesirable in those cases in which the fracture extends into a water zone which, if treated, will produce excessive amounts of water and thereby limit or prevent desired fluid production. Typically, the fracturing fluids and acidizing fluids of these known treatment procedures were aqueous or hydrocarbon solutions.

In U.S. Pat. No. 3,954,142, assigned to the same assignee as the present invention, a process for introducing a treating fluid into a selected region within a fracture is disclosed. In the practice of that invention, a preflush fluid first is introduced into the fracture. A treating fluid having a density sufficiently different from the density of the fluid then is introduced into the fracture whereby the treating fluid is segregated and caused to flow into a desired region within the fracture. To introduce a treating fluid into the upper portion of a substantially vertical fracture in accordance with that invention, for example to avoid a water zone, a high density preflush is pumped ahead of a less dense treating fluid so that the treating fluid will override the higher density preflush. In the event a high density, high viscosity preflush is used to fracture the formation, a low density, low viscosity fluid can be pumped into the formation to create a flow channel over the top of the preflush. A low viscosity fluid must be used because high viscosity fluids tend to move through a fracture in a formation as a mass with less tendency to be affected by differing densities than low viscosity fluids. The low viscosity fluids readily override and underride fluids of differing density.

The use of such fluids is undesirable when liquid-sensitive or permeable formations are to be treated. Large amounts of liquid may cause swelling of clays in the formation or reduce the permeability of the formation to produced fluids. Alternatively, fluid loss additives that often are required in permeable formations may impair the formation conductivity.

To overcome these problems, treatments employing foamed treatment fluids have been developed. Typically, foams contain only 20 to 40 percent liquid. Foamed fluids exhibit low fluid loss characteristics without the use of fluid loss additives. Further, foamed fluids can support proppant material and distribute the proppant more uniformly throughout a fracture than many other fluids.

When an attempt is made to employ foamed treating fluids in the manner disclosed in U.S. Pat. No. 3,954,142 the system is incompatible. The viscosities of foamed fluids are relatively high in comparison to nonfoamed fluids. To introduce a foamed treating fluid into a fracture and cause it to override a foamed preflush, the foamed treating fluid should be less dense and have a lower viscosity than the preflush. If a lower viscosity foam is used, generally such a foam is made by reducing the liquid to gas ratio of the foam; however, this generally results in an increase in the density of the foamed fluid. If a lower density foam is required, generally such a foamed fluid is produced by increasing the liquid to gas ratio of the foam; however, this generally results in an increase in the viscosity of the foam. Thus, both of these systems are incompatible with the fluid characteristics necessary to create the flow channel over the foamed preflush.

SUMMARY OF THE INVENTION

The discovery now has been made which permits foamed treating fluid to be introduced into the upper portion of a substantially vertical fracture in a well formation.

The present invention broadly comprises treating an underground formation containing one or more fractures with a foamed treating fluid which is placed in the upper portion of the fracture by the treatment which comprises the steps of first introducing a foamed preflush into the fracture or fractures and then introducing an inert gas into the fracture in an amount sufficient to create a flow channel over the foamed preflush in the fracture or fractures. A foamed treating fluid having a specific gravity less than or substantially the same as the specific gravity of the preflush then is introduced into the formation through the well bore therein and is segregated and caused to enter the flow channel in the upper portion of the fracture or fractures by the preflush fluid.

DESCRIPTION OF THE PREFERRED EMBODIMENT

The methods of the present invention can be carried out in formations including natural fractures or in formations wherein artificial fractures are created therein and extended by fluid pressure thereon. Further, where fractures are induced in a formation, the foamed preflush fluids of the present invention can be utilized as the fracturing fluid for creating the fractures and the fractures can be extended simultaneously with the performance of the treating method of the present invention.

In treating underground formations penetrated by well bores, particularly those formed of relatively impermeable and fracturable materials, it has become common practice to induce fractures in the most productive zone of such formations. In most formations, the induced fractures generally are substantially vertically oriented. When an induced fracture or fractures are extended outwardly from the well bore, they often also are extended or enlarged in directions upwardly or downwardly or both from the point of initiation. If, during the treatment of the desired zone, an adjacent lower undesirable zone is treated, such as a water-containing zone, excessive quantities of water may be produced with the desired fluids.

The present invention provides a method of treating underground well formations utilizing a foamed treatment fluid whereby the treating fluid is confined to the upper portion of the fractures in the formation, and as a result, the effects of the treatment do not reach undesirable lower portions of the fractures.

The method of the present invention can be adapted for carrying out a variety of treatments in well formations. The method is particularly well adapted for carrying out fracture acidizing treatments whereby high capacity flow channels are formed in the formation and for use in the placement of proppant material to retain induced fractures open after reduction of fluid pressure on the formation.

Figure 1:
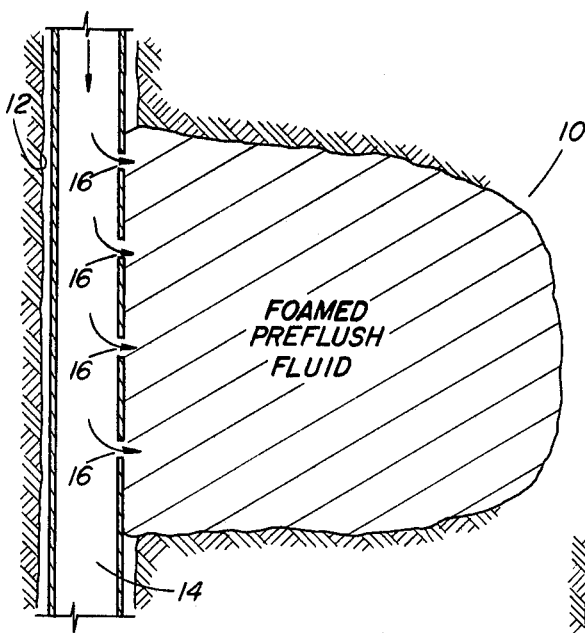
FIG. 1 is a schematic illustration of a fracture in an underground formation after a foamed preflush fluid of the present invention has been introduced therein.

Referring now to the drawings and, particularly to FIG. 1, a vertical fracture 10 in an underground well formation is schematically illustrated. The fracture 10 extends laterally outward from a well bore 12 penetrating the formation. A casing or liner 14 is shown positioned in the well bore 12 having perforations 16 disposed therein positioned adjacent to a desired production zone of the formation. The fracture 10 can be natural or induced, and in either case, a foamed preflush fluid is introduced into the fracture by pumping the foamed fluid under pressure through the conduit 14 into the fracture by way of the perforations 16. As will be understood, if the fracture 10 is induced, the foamed preflush fluid can be utilized for inducing the fracture. Alternatively, a non-foamed fracturing fluid can be utilized employing conventionally known techniques to induce the fracture or fractures.

The preflush fluid can comprise any fluid known to those individuals skilled in the art which is compatible with the other fluids utilized in the treatment. The preflush fluid can comprise, for example, water, alcohols, oils, liquid carbon dioxide and mineral salt solutions.

The foamed preflush fluid is produced by adding a foaming agent or foamable gelling agent which can comprise substantially any of the conventionally known foaming or gelling compounds, to the preflush fluid and then injecting an inert gas, such as air, carbon dioxide or nitrogen, into the fluid. The foaming agent can comprise, for example, an amphoteric surfactant or a silicone base additive. The injection of the inert gas into the fluid can be accomplished in a variety of ways well known to those skilled in the art, all of which bring about a very thorough mixing of the gas with the fluid. A preferred method is to simply pump the inert gas and preflush fluid at high velocities into a T-connection whereby high shear and mixing are produced. The quantity of the inert gas required depends upon the degree of foaming or quality of foam desired, the pressure at which the gas is injected into the fluid and other factors. Generally, a quantity of inert gas in an amount sufficient to provide a foam of a quality in the range of from 50 to 90 at the conditions existing in the formation to be treated is admixed with the fluid. Foam quality as used herein is defined as the ratio of gas volume to the total volume of foam times 100:

$$\text{Quality} = \frac{\text{Gas Volume in Foam}}{\text{Total Foam Volume}} \times 100$$

A foam quality of the fluids used in the present invention in the range of from about 50 to 90 and preferably 60 to 80 has been found to be generally satisfactory in the practice of the method of this invention.

Figure 2:
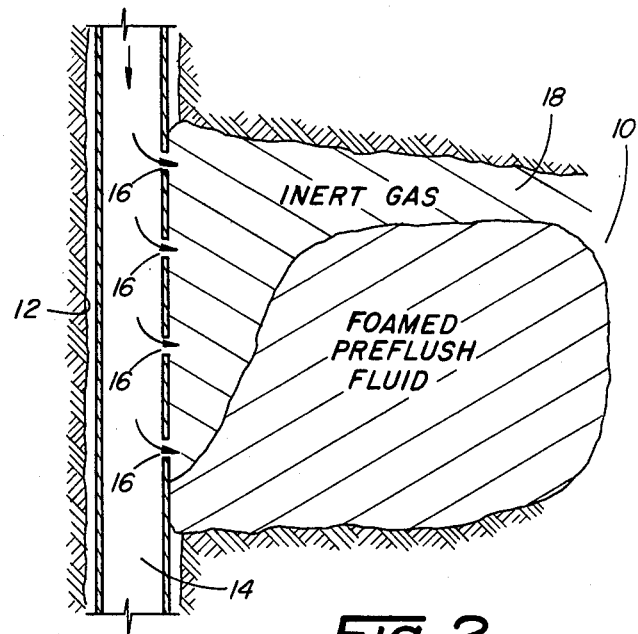
FIG. 2 is a schematic illustration of the fracture of FIG. 1 after an inert gas of the present invention has been introduced therein.

After introduction of the foamed preflush fluid, an inert gas is introduced into the fracture 10 by pumping the gas under pressure through conduit 14 into the fracture by way of perforations 16. Upon entry into fracture 10, the inert gas has been found to override the foamed preflush fluid as illustrated in FIG. 2. A sufficient quantity of the inert gas is introduced to create a flow channel 18 within fracture 10. The inert gas can comprise, for example, air, nitrogen, carbon dioxide if the density of the gas is sufficiently low under the conditions of the formation to be treated, or any other suitable gas. The term "inert gas" as used herein means any gas which does not detrimentally react with either the formation or the other constituents introduced into the formation in a manner that would effect the operability of the method of the present invention.

Figure 3:
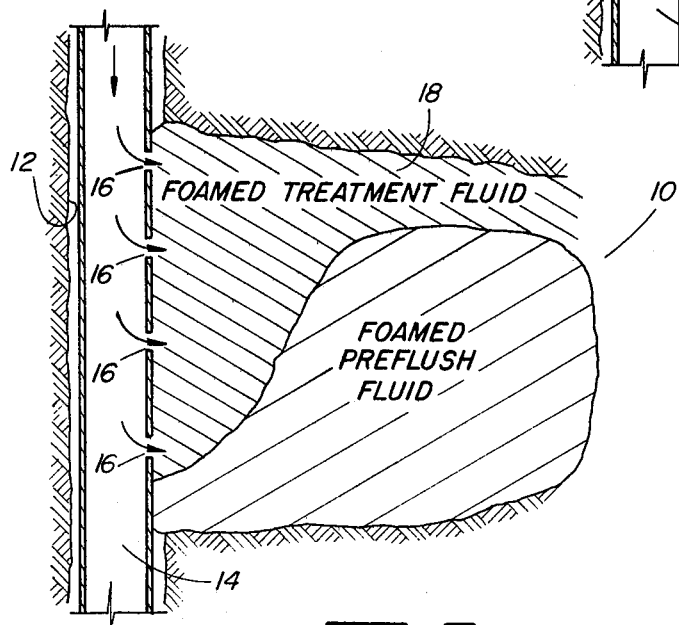
FIG. 3 is a schematic illustration of the fracture of FIG. 1 after a foamed treating fluid has been introduced therein.

Turning now to FIG. 3, after formation of flow channel 18 over the foamed preflush fluid, a foamed treatment fluid is introduced into the formation. The foamed treating fluid is introduced into the fracture 10 by pumping the foamed fluid under pressure through conduit 14 into the fracture by way of perforation 16. The foamed treating fluid which is selected can have a specific gravity less than or substantially the same as the specific gravity of the foamed preflush fluid. The foamed treating fluid enters fracture 10 and flows through channel 18 to fill the upper portion of fracture 10. In order to achieve separation and segregation of the foamed fluids in the fracture, the specific gravity of the treatment fluid preferably is at least 0.03 less than the specific gravity of the foamed preflush fluid at the conditions existing within the formation. Most preferably, foamed treatment fluids are utilized having a specific gravity at least about 0.1 less than the foamed preflush fluid at the conditions in the formation.

When the present method is utilized to effect fracture acidizing, the treating fluid can comprise aqueous acid solutions having specific gravities in the range of from about 1.02 to about 1.34 at room temperature. Particularly preferred aqueous acid solutions comprise hydrochloric acid or hydrochloric acid-organic acid mixtures, such as, for example, hydrochloric acid-acetic acid mixtures. The aqueous acid solution is foamed prior to introduction into fracture 10 in the same manner as the preflush fluid.

As is well understood by those skilled in the art, the foamed acid treating fluid is moved through channel 18 while fracture 10 is maintained in an open position by fluid pressure exerted thereon so that the fracture can be extended and high capacity flow channels can be etched in the upper faces of the open fracture. The acid can be moved through channel 10 by pumping a foamed overflush fluid into the formation that is approximately the same specific gravity as the foamed acid treating fluid. The foamed overflush fluid will tend to move through the same flow channel as the foamed acid in fracture 10 and force the acid ahead of it to the outer extremities of the fracture or fractures. When the fracture has been extended to the desired extent and the acid has become spent, the fluid pressure exerted on the formation is withdrawn causing the fracture or fractures to close, but the high capacity flow channels etched by the acid remain open therein.

When the present method is utilized to effect proppant material transport into a fracture, the fluid can comprise substantially any conventionally known fluid suitable for use in the underground well formation. The foamed treating fluid is produced as previously indicated, however, a proppant material is admixed with the fluid prior to introduction of the inert gas. The proppant material can comprise any of the well known propping agents such as sand, glass beads, rounded walnut shells, sintered bauxite and the like. When determining the specific gravity of the foamed treating fluid, the specific gravity includes the weight of the proppant material carried by the foam.

The foamed treating fluid together with the proppant material is moved through flow channel 10 by continued treating fluid injection into conduit 14 or by introduction of a foamed overflush fluid into conduit 14 having approximately the same specific gravity as the foamed treating fluid. The foamed treating fluid carries the proppant material deeply into the fracture without permitting the proppant to settle out. This provides a uniform distribution of the proppant throughout the upper portion of the fracture or fractures. When the fracture has been extended to the desired extent, the fluid pressure is reduced causing the foamed fluid to break and the fracture or fractures to close, but the proppant material maintains the fracture or fractures in a sufficiently open condition to provide a high capacity flow channel.

A variety of conventional additives can be incorporated with either or both the foamed preflush fluid and treating fluid to vary their physical characteristics, such as, for example, viscosity increasing agents, wetting agents, and the like. When viscosity increasing agents are utilized it may be desirable to include one of the chemicals well known by those in the art as "breakers" for the viscosifying agent to facilitate recovery of the foamed fluids from the formation.

In order to more clearly illustrate the present invention, but not by way of limitation, the following example is presented. In applications wherein it is desired to perform a fracture acidizing treatment or proppant transport in a foamed treatment fluid in a subterranean formation, the foamed acid treating fluid or other foamed treating fluid preferably should have a specific gravity less than the specific gravity of the preflush fluid. The following Table I sets forth various operating conditions which will result in the introduction of the foamed treating fluid into the upper portion of a substantially vertical fracture in a well formation.

TABLE 1

| Treatment No. | Well Bore Data | | | Preflush Fluid[3,4] (Foam Quality, %) | Foamed Preflush Specific Gravity | Treatment Fluid[3,4] (Foam Quality, %) | Foamed Treatment Fluid Specific Gravity |
|---|---|---|---|---|---|---|---|
| | Depth (Ft.) | BHT[1] (°F.) | BHTP[2] (psi) | | | | |
| 1 | 3,000 | 80 | 2,000 | KCl[5] (65) | 0.45 | 15% HCl (75) | 0.38 |
| 2 | 3,000 | 80 | 2,000 | NaCl[6] (75) | 0.41 | 15% HCl (80) | 0.34 |
| 3 | 3,000 | 80 | 2,000 | NaCl (70) | 0.47 | 20% HCl (75) | 0.40 |
| 4 | 3,000 | 80 | 2,000 | NaCl (55) | 0.62 | oil + 3 lb/gal sand (80) | 0.56 |
| 5 | 3,000 | 80 | 2,000 | NaCl (50) | 0.67 | 2% KCl + 3 lb/gal sand (80) | 0.60 |
| 6 | 9,000 | 140 | 6,000 | KCl (65) | 0.56 | 15% HCl (75) | 0.52 |
| 7 | 9,000 | 140 | 6,000 | NaCl (75) | 0.55 | 15% HCl (80) | 0.48 |
| 8 | 9,000 | 140 | 6,000 | NaCl (70) | 0.59 | 20% HCl (75) | 0.53 |
| 9 | 9,000 | 140 | 6,000 | NaCl (55) | 0.72 | oil + 3 lb/gal sand (80) | 0.69 |
| 10 | 9,000 | 140 | 6,000 | NaCl (50) | 0.77 | 2% KCl + 3 lb/gal sand (80) | 0.73 |
| 11 | 15,000 | 200 | 10,000 | KCl (65) | 0.62 | 15% HCl (75) | 0.58 |
| 12 | 15,000 | 200 | 10,000 | NaCl (75) | 0.61 | 15% HCl (80) | 0.55 |
| 13 | 15,000 | 200 | 10,000 | NaCl (70) | 0.65 | 20% HCl (75) | 0.60 |
| 14 | 15,000 | 200 | 10,000 | NaCl (50) | 0.81 | oil + 3 lb/gal sand (80) | 0.76 |

TABLE 1-continued

| Treatment No. | Well Bore Data | | | Preflush Fluid[3,4] (Foam Quality, %) | Foamed Preflush Specific Gravity | Treatment Fluid[3,4] (Foam Quality, %) | Foamed Treatment Fluid Specific Gravity |
|---|---|---|---|---|---|---|---|
| | Depth (Ft.) | BHT[1] (°F.) | BHTP[2] (psi) | | | | |
| 15 | 15,000 | 200 | 10,000 | NaCl (45) | 0.85 | 2% KCl + 3 lb/gal sand (80) | 0.78 |

[1] Bottom Hole Temperature
[2] Bottom Hole Treating Pressure
[3] Fluid foamed with nitrogen gas
[4] Includes surfactant
[5] 2% KCl solution
[6] 1.2 spg NaCl solution It will be apparent from the foregoing that many widely different embodiments of this invention may be made without departing from the spirit or the scope of the invention as defined in the appended claims.

What is claimed is:

1. A method for placing a foamed treating fluid into an upper portion of a fracture in an underground well formation comprising:
   introducing a foamed preflush fluid having a known specific gravity into said fracture;
   introducing an inert gas into said fracture containing said foamed preflush fluid in an amount sufficient to create a flow channel above said foamed preflush fluid in said fracture; and,
   introducing a foamed treating fluid into said fracture whereby said foamed treating fluid is caused to override said foamed preflush fluid and flow through said flow channel formed by said inert gas into an upper portion of said fracture.

2. The method of claim 1 wherein said foamed preflush fluid is produced by foaming a preflush fluid selected from the group consisting of water, alcohols, oils, liquid carbon dioxide and mineral salt solutions.

3. The method of claim 2 wherein said foamed preflush fluid is formed by admixture of said selected solution with at least one gas selected from the group consisting of air, carbon dioxide and nitrogen.

4. The method of claim 1 wherein said inert gas comprises at least one member selected from the group consisting of carbon dioxide, nitrogen and air.

5. The method of claim 1 wherein said foamed treating fluid comprises a foamed acidic solution selected from the group consisting of hydrochloric acid, hydrochloric acid-organic acid mixtures and organic acids.

6. The method of claim 1 wherein said foamed treating fluid includes a proppant material.

7. The method claim 6 wherein said proppant material is carried in the foam in an amount of from about 2 to about 6 pounds per gallon of foam.

8. A method of placing a foamed acid treating fluid into an upper portion of a fracture in an underground well formation comprising:
   introducing a foamed preflush fluid having a known specific gravity into said fracture;
   introducing an inert gas into said fracture containing said foamed preflush in an amount sufficient to create a flow channel above said foamed preflush fluid in said fracture;
   introducing a foamed acid treating fluid into said fracture whereby said foamed acid treating fluid is caused to override said foamed preflush fluid and flow through said flow channel formed by said inert gas into an upper portion of said fracture; and
   introducing a foamed overflush fluid having a specific gravity about the same as said foamed acid treating fluid into said fracture whereby said foamed acid treating fluid is caused to move through said upper portion of said fracture in advance of said foamed overflush fluid.

9. The method of claim 8 wherein said foamed preflush fluid is produced by foaming a preflush fluid selected from the group consisting of water, alcohols, oils, liquid carbon dioxide and mineral salt solutions.

10. The method of claim 8 wherein said foamed preflush fluid is formed by admixture of said selected solution with at least one gas selected from the group consisting of air, carbon dioxide and nitrogen.

11. The method of claim 8 wherein said inert gas comprises at least one member selected from the group consisting of carbon dioxide, nitrogen and air.

12. The method of claim 8 wherein said foamed acid treating fluid comprises a foamed acid solution selected from the group consisting of hydrochloric acid, hydrochloric acid-organic acid mixtures and organic acids.

13. The method claim 8 wherein said foamed acid treating fluid has a specific gravity of at least about 0.03 less than the specific gravity of said foamed preflush fluid.

14. The method of claim 8 which is further characterized to include the initial step of inducing one or more of said fractures.

15. A method for placing a proppant laden foamed treating fluid into an upper portion of a fracture in an underground well formation comprising:
   introducing a foamed preflush fluid having a known specific gravity into said fracture;
   introducing an inert gas into said fracture containing said foamed preflush fluid in an amount sufficient to create a flow channel above said foamed preflush fluid in said fracture; and
   introducing a proppant laden foamed treating fluid having a specific gravity less than the specific gravity of said foamed preflush fluid into said fracture, the specific gravity of said foamed treating fluid being sufficiently less than the specific gravity of said foamed preflush fluid that said foamed treating fluid is caused to override said foamed preflush fluid and flow through said flow channel formed by said inert gas into an upper portion of said fracture.

16. The method of claim 15 wherein said foamed preflush is produced by foaming a preflush fluid selected from the group consisting of water, alcohols, oils, liquid carbon dioxide and mineral salt solutions.

17. The method of claim 15 wherein said inert gas comprises at least one member selected from the group consisting of carbon dioxide, nitrogen and air.

18. The method of claim 15 wherein said foamed treating fluid carries from about 1 to about 6 pounds of proppant per gallon of foam.

19. The method of claim 15 which is characterized further to include the initial steps of inducing one or more of said fractures.

20. The method of claim 15 which is characterized further to include the steps of:
   breaking said proppant laden foamed treating fluid within said upper portion of said fracture whereby said proppant is deposited in said upper portion of said fracture; and
   recovering at least a portion of said broken treating fluid from said fracture.

* * * * *